Dec. 14, 1937. E. LJUNGSTRÖM 2,102,467
MANUFACTURE OF KEYS FOR PRESERVE CANS
Filed Oct. 22, 1935 4 Sheets-Sheet 3
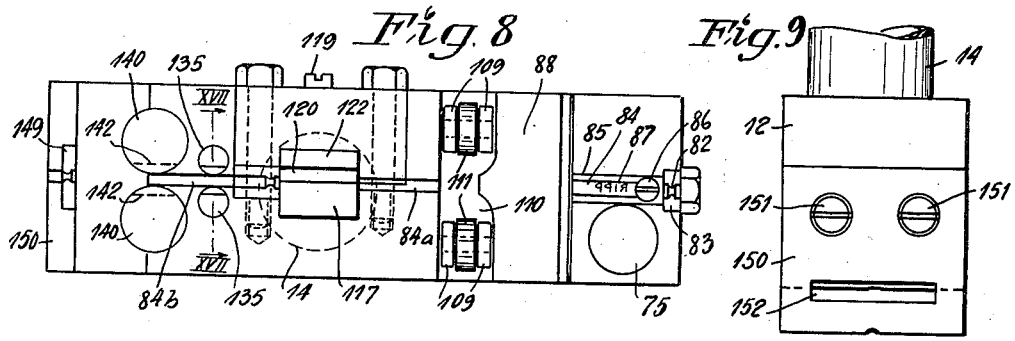
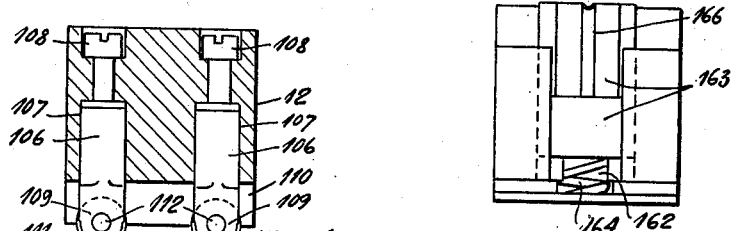
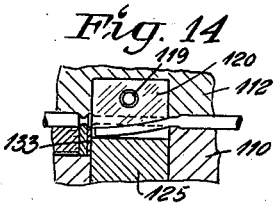
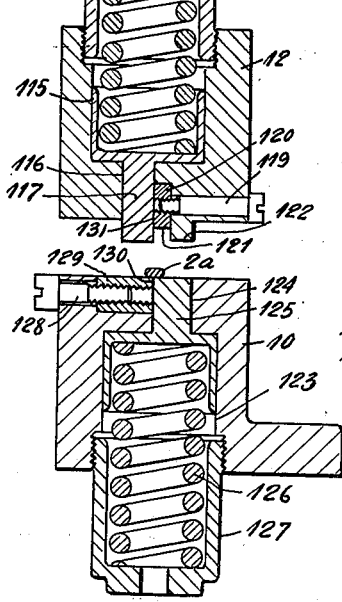
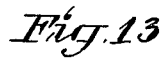
INVENTOR
Erik Ljungström
BY Jarvis C. Marble
his ATTORNEY Dec. 14, 1937.   E. LJUNGSTRÖM   2,102,467
MANUFACTURE OF KEYS FOR PRESERVE CANS
Filed Oct. 22, 1935   4 Sheets-Sheet 4
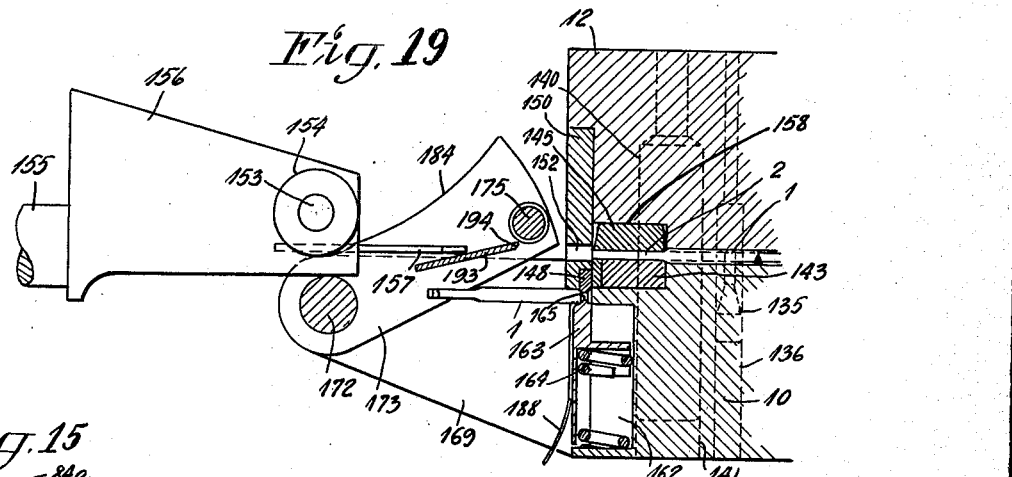
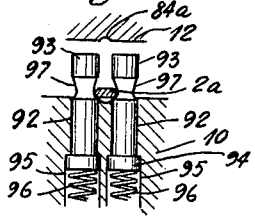
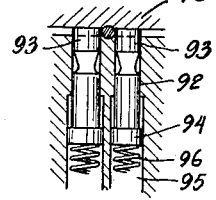
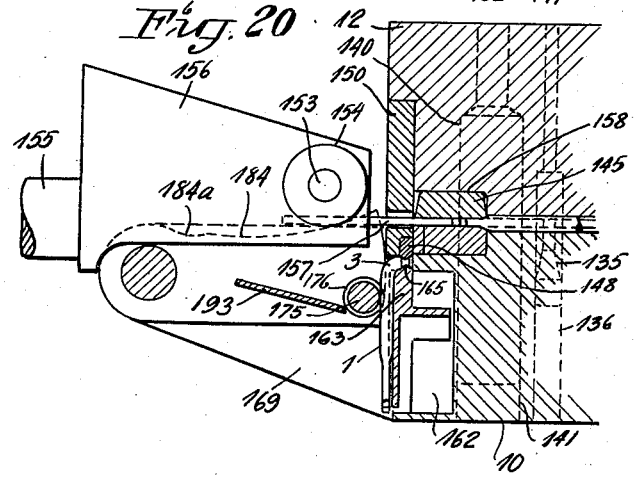
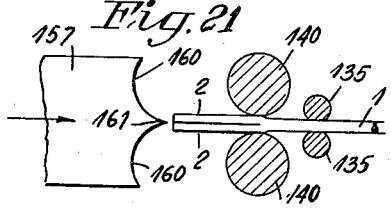
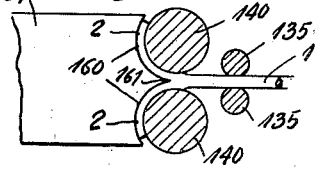
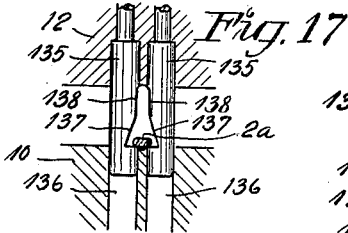
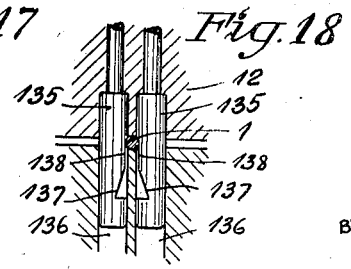
INVENTOR
Erik Ljungström
BY Jarvis C. Marble
his ATTORNEY Patented Dec. 14, 1937

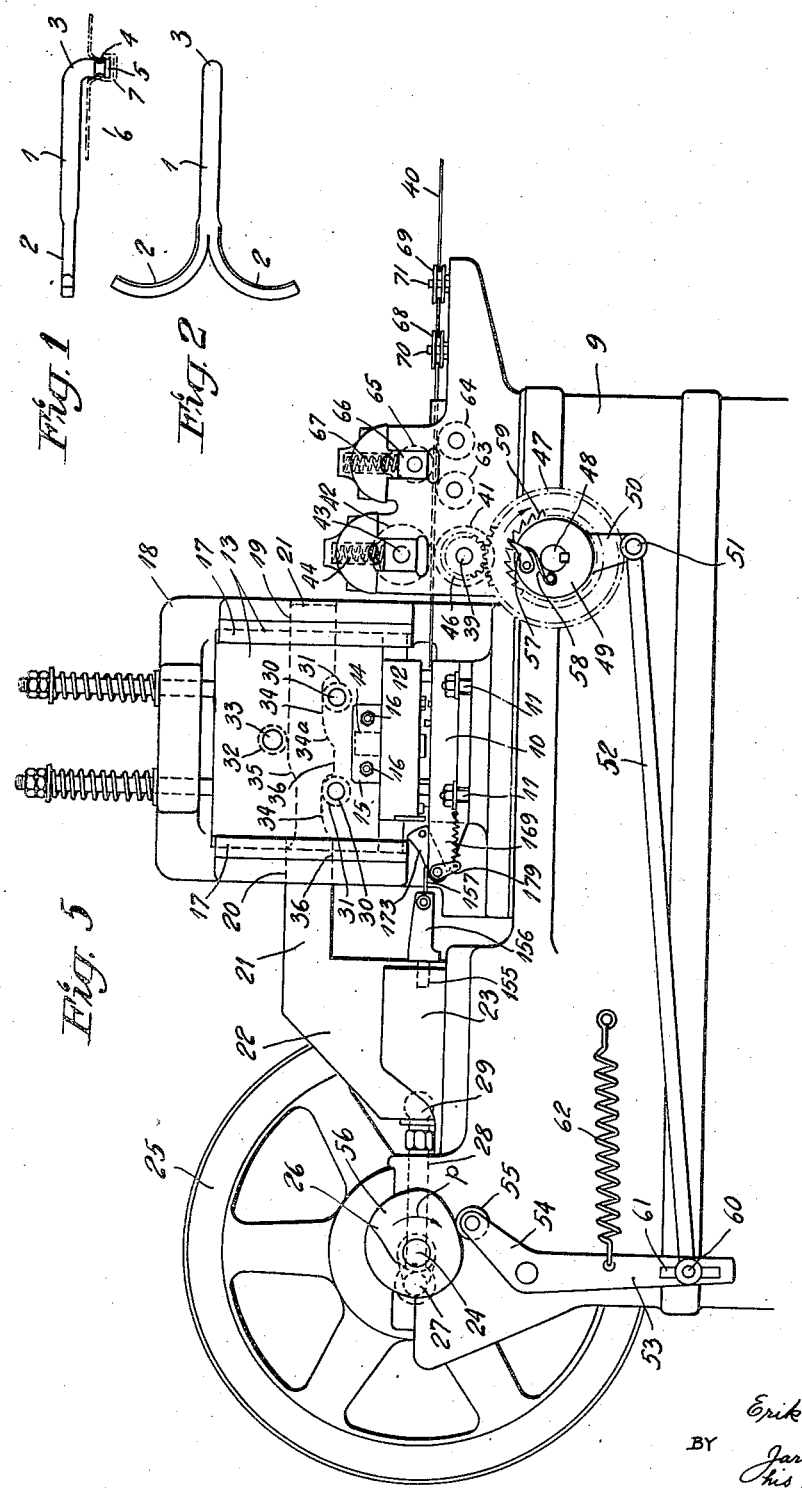

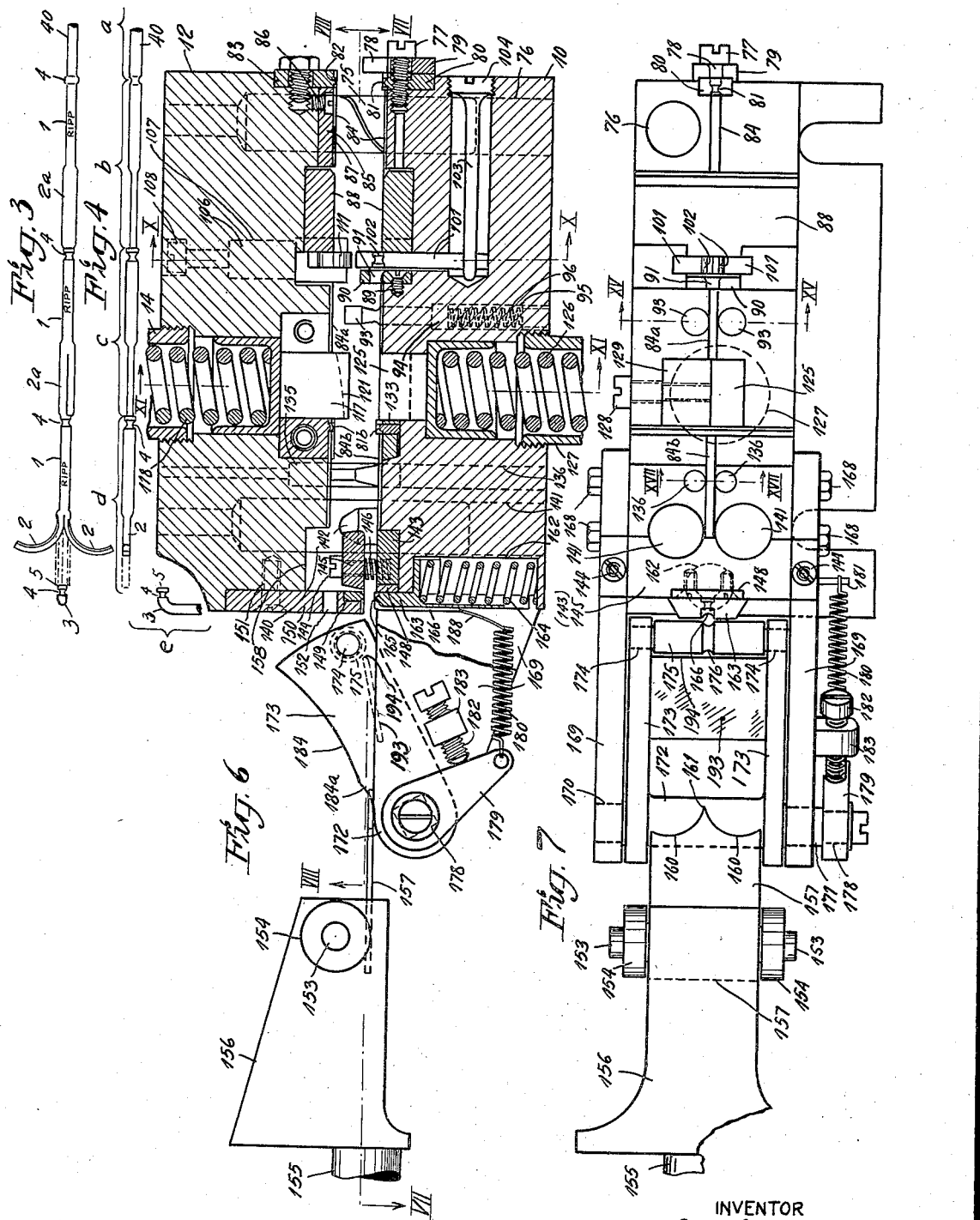

2,102,467

UNITED STATES PATENT OFFICE 2,102,467

MANUFACTURE OF KEYS FOR PRESERVE CANS

Erik Ljungström, Stockholm, Sweden, assignor to Aktiebolaget Transitoria, Stockholm, Sweden, a corporation of Sweden Application October 22, 1935, Serial No. 46,090

18 Claims. (Cl. 140—1)

The present invention relates to the manufacture of tearing members or keys for preserve cans or the like and more particularly of such tearing members or keys which at their one end have a finger grip consisting of two hooks projecting on opposite sides of the longitudinal axis of the key.

The principal object of the invention is to provide a method and a machine for the manufacture of keys of the type described permitting such keys to be produced in a simple and wholly automatic manner.

Another object of the invention is to provide a method for the manufacture of keys of the type described whereby the portion of a key blank intended for the grip is cleft in its longitudinal direction so as to form two shanks which are then bent outwardly in opposite directions.

A further object of the invention is to provide a method for the manufacture of keys of the type described from a round wire in which the portion of the wire intended for the grip is flattened out before being cleft so as to give to the gripping hooks a width greater than the radius of the wire.

Another object of the invention is to provide a method for the manufacture of keys of the type described having at their end opposite to the gripping hooks a bent portion provided with a peripheral groove whereby said groove is shaped simultaneously with the cleaving of the key blank and/or the outward bending of the gripping hooks.

Still another object of my invention is to provide a machine for carrying out the method above set forth having two blocks movable towards and from each other and carrying means for cleaving a key blank in the longitudinal direction thereof to form two shanks and means for bending said shanks outwardly in opposite directions, said last-mentioned means being movable in a plane perpendicular to that in which the cleaving means moves.

Other objects of the invention will be apparent from the following description, reference being had to the accompanying drawings showing by way of example an embodiment of a machine according to the invention.

In the drawings:—

Fig. 1 is a side view of the key to be manufactured in the machine;

Fig. 2 is a plan view of the key;

Fig. 3 is a plan view of a key blank string illustrating the different working operations of the manufacture of the key;

Fig. 4 is a side view of Fig. 3;

Fig. 5 is a front view of an automatic machine according to the invention;

Fig. 6 is a longitudinal sectional view of the two tool blocks;

Fig. 7 is a sectional view of the lower block along the line VII—VII in Fig. 6;

Fig. 8 is a sectional view of the upper block along the line VIII—VIII in Fig. 6;

Fig. 9 is an end view of the two blocks;

Figs. 10 and 11 are sectional views along the lines X—X and XI—XI in Fig. 6, respectively;

Figs. 12 and 13 are partial views of Fig. 11 showing the parts in other positions;

Fig. 14 is a sectional view along the line XIV—XIV in Fig. 12;

Figs. 15 and 17 are sectional views along the lines XV—XV and XVII—XVII in Fig. 7, respectively;

Figs. 16 and 18 are sectional views similar to Figs. 15 and 17, respectively, with the parts in another position;

Figs. 19 to 22 are detail views.

According to Figs. 1 and 2 the tearing member or key to be manufactured in the machine according to the invention comprises a straight arm 1 which has its one end shaped to a grip for the fingers of the hand, said grip consisting of two hooks 2 bent outwardly in opposite directions. At its opposite end arm 1 is provided with a bend 3 having at its outer end a head 5 formed by a peripheral recess or groove and serving to fix the key to the portion of the preserve can or the like to be torn off on opening. The fixation of the key may, preferably, be effected by providing in the sheet material of the preserve can shown in chain-dotted lines in Fig. 1 and designated by 6 a depression 7 into which the head 5 of the key is inserted, the sheet material being then folded into the groove 4 above the head 5.

The key as shown is produced from metal wire, particularly iron or steel wire, of a diameter equal to that of arm 1. The two gripping hooks 2 are formed by the corresponding end of the wire being cleft longitudinally. In order to facilitate the cutting operation by which the wire is cleft and to give to the key a neat appearance the portion of the wire forming the hooks is preferably flattened.

According to the invention the manufacture of the key from the wire is effected by the following five operations illustrated in Figs. 3 and 4.

(a) Feeding of the exact wire length required for the key.

(b) Flattening of the grip portion and preliminary shaping of the groove 4.

(c) Longitudinal cutting of the flattened portion and further shaping of the groove 4.

(d) Outward bending of the gripping shanks.

(e) Cutting off of the key thus formed and bending of the portion 3, said operation rendering possible operation d for the next key blank.

In the machine according to the invention these operations except operation a are carried out simultaneously or approximately simultaneously for different keys at different places of a stepwisely fed string of key blanks (Figs. 3 and 4) during one and the same course of movement of the above-said tool blocks.

The frame of the automatic machine is designated by 9 (Fig. 5). The tool through which the key blank string is moved consists of a lower block 10 rigidly secured to the machine frame by bolts 11 and an upper block 12 fixed to a vertically movable pressing slide 13. The upper block 12 is provided with a stud 14 engaging the pressing slide 13 and secured in position by a locking member 15 and screws 16. The slide 13 moves in guides 17 provided on a part 18 projecting upwardly from the machine frame.

Slidable in guides 19 and 20 in part 18 is a ruler 21 connected to a die 22 slidable in a guide 23 in the machine frame. Journalled in this frame is a shaft 24 rotating at constant speed and driven for instance through a pulley 25 by a motor not shown in the drawings. Secured to shaft 24 is a crank 26 the pin of which is connected to a rod 28 which by means of a universal joint 29 is connected to the die 22 and ruler 21. Thus, during the rotation of shaft 24 a reciprocating movement will be imparted to ruler 21.

Provided in the slide 13 are studs 30 and journalled on said studs are rollers 31 cooperating with the underside of the ruler 21. Cooperating with the upper side of said ruler is a roller 32 journalled on a stud 33 provided on slide 13. The rollers 31 engage guiding surfaces 34 provided on the underside of ruler 21 and roller 32 engages a corresponding guiding surface 35 on the upper side of said ruler. When the ruler is displaced towards the right from the position shown in Fig. 5 slide 13 is first retained in position on account of the rollers 31 engaging a straight portion of the guiding surfaces 34. During this period the key blank is fed forwardly in the manner to be described. On the continued movement of ruler 21 the inclined portion 34a of the guiding surfaces 34 forces rollers 31 and thereby slide 13 and the upper block 12 downwardly against the lower block 10, the above said operations b to e, inclusive, being effected during this period. During this movement roller 32 has slid downwardly onto the guiding surface 35 on the upper side of ruler 21. When the ruler returns towards the left, roller 32 and thereby slide 13 will be raised by the guiding surface 35. The movements are proportioned in such manner that in its lower position the upper block 12 stands still at least during the whole working operation d in order firmly to retain the key blank in position.

The wire string designated by 40 in Fig. 5 is supplied from a reel not shown in the drawings and fed by two feeding rollers 41 and 42 which, preferably, are in toothed engagement with each other. Roller 42 is journalled in a die 43 pressed downwardly by a spring 44 so as to cause the wire 40 to be clamped firmly between the two rollers. The feeding roller 41 is fixed on a stud 39 rotatably mounted in the machine frame, and secured on the same stud is a toothed wheel 46 in mesh with a toothed wheel 47 rotatably mounted on a shaft 48 journalled in the frame. Secured to said shaft 48 is a disk 49 having an arm 50. Connected to said arm 50 by a stud 51 is one end of a rod 52 which at its other end is connected to one arm 53 of a double-armed lever, the other arm 54 of which carries an anti-friction roller 55 riding on the periphery of a cam disk 56 fixed to shaft 24. During the rotation of said cam disk through about a quarter of a revolution in the direction of the arrow p from the position shown in Fig. 5 arm 53 will be displaced towards the left causing rod 52 to be displaced in the same direction. By this displacement a single-acting ratchet coupling provided on disk 49 rotates toothed wheel 47 in the direction of the arrow causing the wire 40 to be fed forwardly. In the example shown this ratchet coupling consists of a pawl 57 rotatably mounted on disk 49 and retained by a spring 58 in engagement with ratchet teeth 59 on toothed wheel 47.

The length of the feeding motion may be varied by varying the point of engagement of rod 52 with arm 53. For this purpose the stud 60 of rod 52 is displaceable in a slot 61 in arm 53. A spring 62 tends to keep the anti-friction roller 55 in engagement with cam disk 56.

Arranged in front of the feeding rollers 41 and 42 is a straightening device in which any bends on the wire are straightened. This device consists of two lower rollers 63 and 64 rotatably mounted on studs on the machine frame and a roller 65 situated above and between said lower rollers. Roller 65 is rotatably mounted in a die 66 which is pressed downwardly by a spring 67. Arranged in front of the straightening device is a pair of guiding rollers 68 and 69 rotatably mounted on pins 70 and 71 on the frame, respectively.

Fig. 6 is a vertical longitudinal sectional view of the lower and upper blocks 10 and 12 of the automatic tool, the upper block 12 being shown in its upper position, that is the same position as in Fig. 5. In this position the feeding of the key blank wire is effected. When the feeding is completed, the upper block is pressed downwardly as described above during which movement the working operations b to e, inclusive, are effected in the following manner.

For the sake of clearness the wire is not shown in Fig. 6 but illustrated above this figure in Fig. 4 in exactly the positions which it assumes in relation to the different parts of the tool seen in longitudinal direction.

Secured in the upper block 12 is a guiding pin 75 slidable in a bore 76 in the lower block 10. Secured at the right end of the lower block 10 by means of a screw 77 is a plate 79 provided with a guiding groove 78 for the key blank wire. The same screw 77 serves also to secure a steel plate 80 having on its upper side a projecting portion 81 which together with a similar portion 82 on a plate 83 secured to the upper block 12 effects a preliminary stamping of the annular groove 4 in the key blank. Provided behind said stamping steels 80 and 83 in the upper and lower blocks are grooves 84 having arcuate cross section in accordance with the shape of the wire. In the example shown the groove in the upper block is provided in a separate steel plate 85 secured by a screw 86. Engraved in said steel plate 85 are letters 87 or other symbols, forming for instance the name of a trade-mark, in the present case the name "Ripp" which is stamped into arm 1 of the key as shown in Fig. 3.

Secured in the upper and lower blocks behind the grooves 84 are flattening plates 88 having plane working surfaces and projecting somewhat beyond the bottom of the grooves 84. By means of these plates 88 flattening is effected of a portion of the key blank which is then to be cleft to form the gripping hooks of the key. The parts 80 to 88, inclusive, perform the first working operation b of the manufacture of the key, and when the upper block has returned from its lowermost position into its upper position as shown in Figs. 5 and 6, the blank has the appearance designated by b in Fig. 4.

When the upper block has returned into its upper position wire 40 is again fed forward, the portion of the key blank designated by b being fed into the position designated by c in Fig. 4. The parts of the tool performing the working operation c will now be described.

Secured to the lower block 10 by a screw 89 is a plate 90 having a guiding hole 91 for the key blank preventing the wire from being raised from the lower block. Provided in bores 92 in said lower block behind said guiding hole are two vertically displaceable guiding pins 93 one pin on each side of the key blank (see Figs. 7, 15 and 16). At their lower end the pins have each a head 94 sliding in a bore 95 and actuated from below by a spring 96 which tends to force the pin upwardly. Further the pins have each a portion 97 of reduced diameter. When the key blank is fed forwardly and the upper block 12 occupies the position shown in Figs. 6 and 15, the reduced portions 97 allow the flattened portion 2a of the key blank to be fed forwardly. When moving downwardly after the feeding is completed the upper block presses the guiding pins 93 downwardly so as to cause the portions of the pins of the greater diameter firmly to clamp the arm 1 of the key blank which is then in position between the pins (Fig. 16), rounded grooves 84a suited to said arm being provided in the upper and lower blocks.

Provided immediately behind the flattening plates 88 is a stamping device for the annular groove 4 in the key blank (see also Fig. 10). Provided in a recess 100 in the lower block 10 are two pinching arms 101 forming a pair of scissors and provided on their surfaces facing each other with stamping members 102 similar to the above-said projections 81, 82 but acting perpendicular to same so as to impart to the groove 4 in the key blank a uniform shape all about the wire. The arms 101 are rotatable in relation to each other about a spindle 103 inserted through a bore and secured in position by a head 104 threaded into said bore (see Fig. 6). A blade spring 105 tends to keep the pinching arms 101 apart.

Provided in the upper block 12 are two pins 106 secured in bores 107 by screws 108. At its lower end each pin has two lugs 109 (see also Figs. 8 and 10) extending downwardly into a recess 110 in the upper block. Journalled on a pin 112 between the lugs 109 of each pin 106 is an anti-friction roller 111. When the upper block moves downwardly, said rollers engage the inclined surfaces 113 on the pinching arms 101 causing said arms to be moved towards each other whereby the stampng members 102 are pressed against the wire so as to shape the groove 4 therein.

Simultaneously with this movement and in the same operation the portion which is to form the gripping hooks 2 is cleft or cut, the means for effecting this operation being best described with reference to Figs. 6 and 11 to 14, inclusive. Slidable in vertical direction in a bore 115 and a slot 116 in the upper block is a slide 117 pressed downwardly by a very strong spring 118. With its upper end spring 118 bears against the bottom of a sleeve 14 screwed into the upper block. The sleeve 14 may, preferably, simultaneously serve to connect said block to the slide 13 (see Fig. 1). Secured to the upper block on the underside thereof by means of a screw 119 is a cutting tool 120 bearing tightly against the plane lateral surface of the slide 117. The lower edge surface 121 of the tool extends beyond the lower surface of the upper block, and the lower edge of the slide 117 extends through a further distance below the cutting tool. Projecting from the underside of the upper block is an abutment 122, the lower surface of which also extends below the edge surface 121 of the cutting tool. Vertically slidable in a bore 123 and a slot 124 in the lower block 10 is a returning slide 125 pressed upwardly by a strong spring 126 which with its lower end bears against the bottom of a sleeve 127 screwed into the lower block 10. Secured to the lower block by a screw 128 is a cutting tool 129 the inner edge 130 of which is in alignment with the inner edge 131 of the upper cutting tool 120, whereas its upper surface is in alignment with the upper surface of the lower block.

When in position for the operation c the key blank is retained by the flattened portion 2a with its one longitudinal half resting on the lower cutting tool 129, whereas the other half rests on the upper surface of the returning slide 125 right below the upper cutting tool 120 as shown in Fig. 11.

When the upper block 12 moves downwardly, the lower edge of slide 117 will first strike the flattened portion 2a causing the spring 118 to be compressed and the portion 2a to be firmly kept in position. Approximately at the same time the abutment 122 is forced against the returning slide 125 moving said slide downwardly while compressing spring 126. Thereupon the cutting edge 121 of the upper cutting tool 120 meets the flattened portion 2a.

As shown in Fig. 6, the edge 121 is inclined in such manner that its left end will first meet the key blank. The left portion of the cutting edge 121 cooperates with a transversely extending cutting tool 133 (see Figs. 6 and 14) by which the half of the flattened portion 2a engaged by the cutting tool 120 will be cut off transversely at its end. The other half of the blank is not cut off but remains connected with the preceding key blank in order to enable the latter to be fed forward from position d into position e. Then the continued cleaving operation takes place as a shearing, and when the upper block 12 attains its lowermost position, the parts take up the positions shown in Figs. 12 and 14, the flattened portion 2a being cut into two shanks 2.

When the upper block is again moved upwardly, slide 117 under the action of spring 118 still retains the left shank 2 of the key blank (see Figs. 12 and 13). The right shank 2 bent downwardly by the cutting tool 120 will now be straightened by the returning slide 125 under the action of the strong spring 126 so as to cause both of the shanks to be brought into alignment with each other, when the returning slide has attained its upper position (see Fig. 13). Then the working operation c is completed.

When the wire 40 is now fed forward, the key blank is displaced from position c into the position designated by d in Fig. 4, the blank having the shape shown by chain-dotted lines in Figs. 3 and 4.

Immediately close by the cutting device just described there are further stamping members 81b for the groove 4 in the key blank. These members as well as other existing stamping members have also for their purpose, in the lower position of the upper block firmly to hold the key blank in position so as to prevent it from displacement in longitudinal direction, when the working operations are carried out. Also in this working position d the upper and lower blocks are provided with rounded grooves 84b for arm 1 of the key blank. Further there are two guiding pins 135 fixed to the upper block 12 and slidable in bores 136 in the lower block 10. These guiding pins serve the same purpose as the above-said guiding pins 93 and are on their inner side provided with a recess 137 (see Fig. 17), said recesses being so shaped as to allow the flattened portion 2a of the key blank to pass therebetween, when the upper block is in its highest position. When the blank has been fed forwards, the round arm 1 lies between the pins 135, and when the block moves downwardly said arm 1 is clamped between shallower portions 138 of the recesses 137 as shown in Fig. 18.

Fixed in the upper block 12 are two coarse pins 140 (see Figs. 6, 19 and 20) sliding in bores 141 in the lower block 10. On their surfaces facing each other the pins 140 are provided with recesses 142 permitting the key blank to pass freely between the pins, when the upper block occupies its uppermost position. Fixed on the lower block is a steel plate 143, and secured in said plate on each side of the lower block is a screw pin 144. Vertically displaceable on said screw pins 144 is a guiding plate 145 the screw heads limiting the upward movement of said plate. Arranged around the screws 144 between the plates 143 and 145 are spiral springs 146 tending to displace the guiding plate 145 upwardly into engagement with the head of the screws 144.

Arranged in the lower block immediately close by the plate 143 is a cutting tool 148 cooperating with a cutting tool 149 mounted on a plate 150 secured by screws 151 to the left end wall of the upper block (see also Fig. 9). Provided in the plate 150 is a slot 152 which lies right opposite the opening between the guiding plate 145 and the plate 143, when the upper block occupies its lower position.

Secured by a stud 155 on the die 22 carrying the ruler 21 (see Figs. 5 to 7) is a carrier 156 moving horizontally together with the ruler. Fixed to carrier 156 is a bending plate 157 the underside of which is in alignment with the upper surface of lower block 10. When the upper block occupies its lower position bending plate 157 is allowed to pass through slot 152 in plate 150 secured to the left end wall of the upper block. The distance of the fore edge of the bending plate from the plate 150 is such that said fore edge is moved onto the plate 150 approximately simultaneously as the inclined surfaces 34a of the ruler have pressed the rollers 31 and, thus, the upper block 12 into their lower position. When then the ruler continues its movement the rollers 31 ride on the plane surfaces 36 so as to cause the upper block to be retained in its lower position, whereas the bending plate 157 passes through the slot and into the space between the upper and lower blocks.

All the above said parts 81b, 84b and 135 to 157 belong to the working operation d except the cutting tools 148, 149 which belong to the working operation e. Already at the beginning of the downward movement of the upper block said tools cut off the connection between the key blank with the next preceding key blank which occupies the position e, that is to say they cut off the shank of the flattened portion by which the key blank was still connected with the preceding key blank, the other shank having been cut off already in operation c.

The working operation d proceeds as follows: When after completed feeding the key blank occupies the position d in Fig. 4 the upper block moves downwardly. The guiding pins 135 and the pins 140 retain the key blank laterally and the stamping tools 81b retain it in longitudinal direction. The surface 158 of the upper block presses the guiding plate 145 downwardly against the shank portion 2 of the blank. Just when the upper block has attained its lowermost position, the parts occupy the position shown in Fig. 19. In this position the rollers 31 on slide 13 are just in engagement with the surfaces 36 on the ruler 21.

On its fore edge the bending plate 157 is formed in accordance to the final shape of the gripping hooks 2. The curved edges 160 of the plate 157 (see Figs. 21 and 22) have a radius equal to that of the pins 140 plus the thickness of the gripping hooks 2 and the curves meet each other in a sharp point 161 at the middle of the plate, said point being situated right opposite the longitudinal slot cut in the flattened portion of the key blank during the working operation c as shown in Fig. 21. Fig. 20 shows a side view of the parts in this position. The upper and lower blocks are so situated in relation to the driving shaft 24 (see Fig. 5) that the parts occupy the position shown in Fig. 22, when crank 26, 27 occupies its inner dead centre. Thereupon the parts return to the starting position shown in Fig. 5 and the wire 40 as well as the key blanks treated in the working operations b, c, d are fed one step forwards, the guiding plate 145 preventing the gripping shanks 2 from striking the cutting tool 149.

Following means are provided for the last working operation e. The lower surface of the cutting tool 149 is formed in agreement with the shape of the groove 4, said groove being situated right below said tool, when the blank is in starting position for this operation. Vertically slidable in a recess 162 in the lower block 10 is a slide 163 which is kept in its upper position by a strong spiral spring 164 (see Figs. 6, 19 and 20). The upper edge 165 of the slide which is normally in alignment with the upper surface of the lower block 10 is shaped in accordance with groove 4 in the key blank and situated right below the cutting tool 149, the blank being gripped by these parts at the place of said groove, when the upper block moves downwardly. In the outer vertical surface of the slide 163 is a vertical groove 166 (see Fig. 9) rounded in agreement with the key arm 1.

Secured at the left end of the lower block 10 by means of screws 168 (see Figs. 6 and 7) are two lugs 169 forming at their outer end journals for studs 170, 171 secured in a swingable device consisting of two cam disks 173 connected with each other by a bridge 172. Rockably mounted on studs 174 at the ends of the cam disks 173 facing the lower block is a pressing roller 175 provided with a groove 176 situated in vertical alignment with groove 166 in slide 163. Secured on a square portion 178 of stud 171 is an arm 179. One end of a spring 180 is secured to the outer end of said arm and at its other end the spring is fixed to a pin 181 in the lower block (see Fig. 7), said spring tending to swing the cam disks 173 upwardly. This upward swinging movement is limited by a stop screw 182 engaging arm 179 and threaded into a lug 183 secured to lug 169.

Rotatably mounted on the carrier 156 by studs 153 are rollers 154 situated in vertical alignment with the cam disks 173, said roller engaging the cam surface 184 on said disks during the forward movement of the carrier swinging the disks downwardly.

Provided between the plates 173 is a guiding plate 193 the fore edge of which is situated immediately behind the lower edge of the pressing roller 175. The guiding plate 193 is arranged obliquely in such a manner that, when the string of key blanks is fed forwardly, the gripping shanks bent outwardly during the operation d strike the lower surface of the guiding plate and are forced against said surface during the feeding motion whereby the gripping shanks are caused always to take up equal position of height in relation to each other. This measure is taken in order to prevent the string of key blanks from turning about its longitudinal axis, as when such turning occurs the bent portion e formed during the operation to be described in the following will be angularly displaced in relation to the plane of the gripping shanks, that is to say the key will be twisted.

The course of the working operation e is as follows: When the upper block moves downwardly the cutting tools 148 and 149 first cut off the key blank from the following key blank which is in position d. The key blank thus cut off is clamped between the cutting tool 149 and the upper surface of slide 163 and is moved into the position shown in Fig. 19 during the continued downward movement of the upper block 12 causing spring 164 to be compressed. When the upper block has attained its lower position slide 163 may strike the bottom of recess 162, provided such a strong spring 164 not being used that this becomes unnecessary. When the parts assume this position rollers 154 are exactly opposite the cam surfaces 184 on the disks 173. The first portion 184a of said cam surfaces is rather steep so that already a small displacement of the rollers 154 will cause the disks 173 to be swung downwardly through such an angle that the bending plate 157 can pass freely above the pressing roller 176. Then the rollers 154 ride up on the less steep portion of the cam surfaces 184 causing the roller 175 to be pressed against the key blank bending same in such manner as to form the bend 3, Fig. 1. In this position arm 1 of the key rests in groove 176 in the roller 175 and groove 166 in slide 163 (Fig. 20).

After this working operation the key is finished. When the upper block returns to its upper position and the carrier 156 is simultaneously drawn backwards, spring 180 returns the cam disks 173 to starting position and the key is thrown out from the machine by a spring 188 or by the new key blank fed forwards. The finished keys may be collected in a basket placed below the machine or carried away in any other suitable manner.

In order to attain necessary exactness in the manufacture it is necessary that the feeding of the key blank string takes place with always exactly equal lengths. When the portion 2a is flattened in operation b it may be foreseen that the creeping occurring in the material will have a tendency of lengthening the key blank though only slightly. In order to prevent such a change in length of the key blank the arrangement may be such that the pinching arms 101 are pressed round the groove 4 somewhat before the flattening tools 88 begin to work so that longitudinal elongations of the material will be limited at this point, this being effected by shaping the cam surfaces 113 of the pinching arms 101 correspondingly.

What I claim is:—

1. A method of manufacturing tearing members or keys for preserve cans from a metal string, which comprises stepwisely feeding the string through predetermined equal lengths while subjecting each of said lengths to the following operations in the order named: cleaving an end portion of the string length in its longitudinal direction to form two shanks while shaping the remaining portion of the string length to adapt same for fixation to the can, bending said shanks outwardly in opposite directions to form gripping hooks, and severing the string length thus treated from the following string.

2. A method of manufacturing tearing members or keys for preserve cans from a metal string, which comprises stepwisely feeding the string through predetermined equal lengths while subjecting each of said lengths to the following operations in the order named: forming a longitudinal cut in the string length at one end thereof while shaping the string length at its other end to adapt same for fixation to the can, severing the string length at its cut end from the preceding string length to form two shanks, bending said shanks outwardly in opposite directions to form gripping hooks, and severing the string length thus treated from the following string.

3. A method of manufacturing tearing members or keys for preserve cans from a wire, which comprises stepwisely feeding the wire through predetermined equal lengths while subjecting each of said lengths in succession to the following operations: flattening an end portion of the wire length substantially in its longitudinal plane, cleaving said flattened portion in its longitudinal direction while shaping the remaining portion of the wire length to adapt same for fixation to the can, severing the wire length at its cleft end from the preceding wire length to form two shanks, bending said shanks outwardly in opposite direction to form gripping hooks, and severing the wire length thus treated from the following wire.

4. A method of manufacturing tearing members or keys for preserve cans from a wire, which comprises stepwisely feeding the wire through predetermined equal lengths while subjecting each of said lengths in succession to the following operations: exerting a pressure on an end portion of the wire length perpendicularly to the longitudinal axis thereof to flatten out said portion and preliminarily shaping the remaining portion of the wire length to adapt same for fixation to the can, cleaving said flattened portion in its longitudinal direction while further shaping said remaining portion to adapt it for such fixation, severing the wire length at its cleft end from the preceding wire length to form two shanks, bending said shanks outwardly in opposite direction to form gripping hooks, and severing the wire length thus treated from the following wire.

5. A method of manufacturing tearing members or keys for preserve cans from a metal string, which comprises stepwisely feeding the string through predetermined equal lengths while subjecting each of said lengths in succession to the following operations: cleaving an end portion of the string length in its longitudinal direction to form two shanks while forming a peripheral groove in the remaining portion of the string length to adapt same for fixation to the can, bending said shanks outwardly in opposite directions to form gripping hooks, and severing the string length thus treated from the following string.

6. A method of manufacturing tearing members or keys for preserve cans from a wire, which comprises stepwisely feeding the wire through predetermined equal lengths while subjecting each of said lengths in succession to the following operations: exerting a pressure on an end portion of the wire length perpendicularly to the longitudinal axis thereof to flatten out said portion and preliminarily forming a peripheral groove in the remaining portion of the wire length, cleaving said flattened portion in its longitudinal direction and further shaping said groove, severing the wire length at its cleft end from the preceding wire length to form two shanks, bending said shanks outwardly in opposite directions to form gripping hooks, severing the wire length from the following wire and bending the grooved end portion angularly to the longitudinal axis of the wire length to provide a can engaging end portion.

7. A method of manufacturing tearing members or keys for preserve cans from a wire, which comprises stepwisely feeding the wire through predetermined equal lengths while subjecting each of said lengths in succession to the following operations: exerting a pressure on a fore end portion of the wire length, reckoned in the direction of feeding, perpendicularly to the longitudinal axis thereof to flatten out said portion and preliminarily forming a peripheral groove at the rear end of the wire length, cleaving the flattened portion in its longitudinal direction and further shaping said groove, severing the wire length at its fore end from the preceding wire length to form two shanks, bending said shanks outwardly in opposite directions to form gripping hooks, severing the wire length at its rear end from the following wire and bending the grooved end portion angularly to the longitudinal axis of the wire length to provide a can engaging end portion.

8. A method of manufacturing tearing members or keys for preserve cans from a wire, which comprises stepwisely feeding the wire through predetermined equal lengths while subjecting each of said wire lengths in succession to the following operations: exerting a pressure on a fore end portion of the wire length, reckoned in the direction of feeding, perpendicularly to the longitudinal axis thereof to flatten out said portion while simultaneously preliminarily forming a peripheral groove in the wire length at the rear end thereof, forming in said flattened portion a longitudinal cut and from the fore end of said cut a transverse cut partially separating the wire length from the preceding one while simultaneously further shaping said groove, completely separating the wire length from the preceding one to form two shanks, bending said shanks outwardly in opposite directions to form gripping hooks, severing the wire length at its rear end from the following wire and bending the grooved end portion perpendicularly to the axis of the wire length to provide a can engaging end portion.

9. A method of manufacturing tearing members or keys for preserve cans from a wire, which comprises feeding the wire through a predetermined distance corresponding to the length of a key blank, exerting a pressure on a fore end portion of said key blank, reckoned in the direction of feeding, perpendicularly to the longitudinal axis of the blank to flatten out said portion and simultaneously preliminarily forming a peripheral groove in a rear end portion of the blank, feeding the blank through the same distance, cleaving the flattened portion in its longitudinal direction and further shaping said groove, feeding the blank through the same distance, severing the key blank at its fore end from the preceding key blank to form two shanks, feeding the blank through the same distance, bending said shanks outwardly in opposite directions to form gripping hooks, feeding the blank through the same distance, severing the blank at its rear end from the following wire, and bending the grooved end portion angularly to the longitudinal axis of the key blank to provide a can engaging end portion.

10. A method of manufacturing tearing members or keys for preserve cans from a metal string, which comprises feeding the string through a predetermined distance corresponding to the length of a key blank, cleaving an end portion of the string length in its longitudinal direction to form two shanks while shaping the remaining portion of the string length to adapt same for fixation to the can, feeding the string through the same distance, bending said shanks outwardly in opposite directions to form gripping hooks, feeding the string through the same distance, and severing the string length from the following string.

11. A machine for the manufacture of tearing members or keys for preserve cans, comprising means to feed a metal string through the machine step by step in predetermined equal lengths, means to cleave an end portion of the string length in the longitudinal direction thereof to form two shanks, means to bend said shanks outwardly in opposite directions, means to shape the other end portion of the string length to adapt same for fixation to the can, and means to sever the string length thus treated from the string.

12. A machine for the manufacture of tearing members or keys for preserve cans, comprising means to feed a metal string through the machine step by step in predetermined equal lengths, means to cleave an end portion of the string length in the longitudinal direction thereof to form two shanks, means to bend said shanks outwardly in opposite directions, means to form a peripheral groove in the other end portion of the string length, and means to sever the string length thus treated from the string.

13. A machine for the manufacture of tearing members or keys for preserve cans, comprising means to feed a wire through the machine step by step in predetermined equal length, means to flatten out an end portion of the wire length in the longitudinal plane thereof, means to cleave said end portion in the longitudinal direction thereof to form two shanks, means to bend said shanks outwardly in opposite directions, means to shape the other end portion of the wire length to adapt same for fixation to the can, and means to sever the wire length thus treated from the wire.

14. A machine for the manufacture of tearing members or keys for preserve cans, comprising means to feed a wire through the machine step by step in predetermined equal lengths, means to flatten out an end portion of the wire length in the longitudinal plane thereof, means to cleave said end portion in the longitudinal direction thereof to form two shanks, means to bend said shanks outwardly in opposite directions, means to shape the other end portion of the wire length to adapt same for fixation to the can, means to sever the wire length thus treated from the wire, and means to bend said latter end portion angularly to the longitudinal axis of the wire length.

15. A machine for the manufacture of tearing members or keys for preserve cans, comprising means to feed a metal string through the machine step by step in predetermined equal lengths, means to cleave an end portion of the string length in the longitudinal direction thereof to form two shanks, means to bend said shanks outwardly in opposite directions, means to shape the other end portion of the string length to adapt same for fixation to the can, means to sever the string length thus treated from the string, and means to clamp the string length in position during the operation of said bending means.

16. A machine for the manufacture of tearing members or keys for preserve cans, comprising means to feed a wire step by step in predetermined equal lengths through a plurality of working positions, one working position comprising means to flatten out a fore end portion of the wire length, reckoned in the direction of feeding, substantially in the longitudinal plane thereof and means preliminarily to form a peripheral groove in the wire length in a rear end portion thereof, another working position comprising means to cleave said flattened portion in the longitudinal direction thereof and means to complete the shaping of said groove, a further working position comprising means to bend said cleft parts outwardly in opposite directions to form gripping hooks, and a still further working position comprising means to sever the wire length from the wire at the rear end of said wire length and means to bend the grooved end portion angularly to the longitudinal axis of the wire length, said severing means being so timed in relation to said hook forming means as to be brought into operation before the latter.

17. A machine for the manufacture of tearing members or keys for preserve cans, comprising means to feed a metal string through the machine step by step in predetermined equal lengths, means to cleave an end portion of the string length in the longitudinal direction thereof to form two shanks, means to bend said shanks outwardly in opposite directions, means to shape the other end portion of the string length to adapt same for fixation to the can, means to sever the string length thus treated from the string, and two blocks movable towards and from each other and carrying said cleaving means, bending means, shaping means and severing means.

18. A machine for the manufacture of tearing members or keys for preserve cans, comprising means to feed a wire through the machine step by step in predetermined equal lengths, means to flatten out an end portion of the wire length in the longitudinal direction thereof, means to cleave said end portion in the longitudinal direction thereof to form two shanks, means to bend said shanks outwardly in opposite directions, means to shape the other end portion of the wire length to adapt same for fixation to the can, means to sever the wire length thus treated from the wire, means to bend said latter end portion angularly to the longitudinal axis of the wire length, and two blocks movable towards and from each other and carrying said flattening means, cleaving means, first-mentioned bending means, shaping means, severing means and last-mentioned bending means.

ERIK LJUNGSTRÖM.